(12) United States Patent
Luo et al.

(10) Patent No.: US 11,704,871 B2
(45) Date of Patent: Jul. 18, 2023

(54) GARMENT DEFORMATION METHOD BASED ON THE HUMAN BODY'S LAPLACIAN DEFORMATION

(71) Applicant: SHANGHAI LINCTEX DIGITAL TECHNOLOGY CO, LTD., Shanghai (CN)

(72) Inventors: Likang Luo, Shanghai (CN); Luyuan Wang, Shanghai (CN); Xiaogang Jing, Shanghai (CN); Chen Liu, Shanghai (CN); Ninghai Huang, Shanghai (CN); Zexi Shao, Shanghai (CN)

(73) Assignee: SHANGHAI LINCTEX DIGITAL TECHNOLOGY CO, LTD., Shanghai (CN)

( * ) Notice: Subject to any disclaimer, the term of this patent is extended or adjusted under 35 U.S.C. 154(b) by 62 days.

(21) Appl. No.: 17/520,593

(22) Filed: Nov. 5, 2021

(65) Prior Publication Data

US 2022/0058873 A1     Feb. 24, 2022

Related U.S. Application Data

(63) Continuation of application No. PCT/CN2019/105295, filed on Sep. 11, 2019.

(30) Foreign Application Priority Data

May 7, 2019 (CN) .......................... 201910376727.2

(51) Int. Cl.
*G06T 17/20* (2006.01)
*G06T 17/10* (2006.01)
(Continued)

(52) U.S. Cl.
CPC ............ *G06T 17/205* (2013.01); *G06T 17/10* (2013.01); *G06V 40/10* (2022.01)

(58) Field of Classification Search
None
See application file for complete search history.

(56) References Cited

U.S. PATENT DOCUMENTS

| 9,990,764 B2 * | 6/2018 | Bell ........................ G06F 30/20 |
| 2007/0273711 A1 * | 11/2007 | Maffei .................... G06T 17/20 |
| | | 345/639 |

(Continued)

FOREIGN PATENT DOCUMENTS

| CN | 103678769 A | 3/2014 |
| CN | 104821006 A | 8/2015 |

(Continued)

OTHER PUBLICATIONS

Li et al, "Customizing 3D garments based on volumetric deformation", Computers in Industry 62 (2011) 693-707, 2011 Elsevier B.V., https://www.sciencedirect.com/science/article/pii/S0166361511000443 (Year: 2011).*

(Continued)

*Primary Examiner* — Tize Ma

(57) ABSTRACT

A method of garment deformation based on Laplacian deformation of a human body, including the following steps: inputting polygonal mesh models of the human body and the garment; discretizing non-homogeneous mesh models of the human body and the garment inputted in the first step; clustering all the discretized mesh vertices, to reduce a number of vertices and to form a set of homogeneous discrete vertices; constructing Laplacian matrices of the human body and the garment; preprocessing and solving inverse matrices; editing by using the human body mesh as a control vertex, to drive a real-time smooth deformation of the garment mesh; and mapping a deformed and simplified mesh back to a mesh space of an original resolution to obtain deformed human body and garment mesh models.

8 Claims, 2 Drawing Sheets

(51) Int. Cl.
*G06K 9/00* (2022.01)
*G06V 40/10* (2022.01)

(56) References Cited

U.S. PATENT DOCUMENTS

2014/0375635 A1   12/2014  Johnson et al.
2018/0240280 A1*  8/2018  Chen ...................... G06T 19/20
2018/0315254 A1*  11/2018  Grant ..................... G06T 13/40
2019/0139303 A1*  5/2019  Leong .................... G06F 30/20

FOREIGN PATENT DOCUMENTS

| | | |
|---|---|---|
| CN | 106096130 A | 11/2016 |
| CN | 106960463 A | 7/2017 |
| CN | 107798713 A | 3/2018 |
| CN | 110176063 A | 8/2019 |

OTHER PUBLICATIONS

International Search Report of PCT/CN2019/105295.
Written Opinion of PCT/CN2019/105295.

* cited by examiner

GARMENT DEFORMATION METHOD BASED ON THE HUMAN BODY'S LAPLACIAN DEFORMATION

CROSS-REFERENCE TO RELATED APPLICATIONS

This application is a bypass continuation application of PCT application no.: PCT/CN2019/105295. This application claims priorities from PCT Application No. PCT/CN2019/105295, filed Sep. 11, 2019, and from the Chinese patent application 201910376727.2 filed May 7, 2019, the contents of which are incorporated herein in the entirety by reference.

TECHNICAL FIELD

The invention relates to the field of 3D mesh deformation technology, in particular to a garment deformation method based on the human body's Laplacian deformation.

BACKGROUND TECHNOLOGY

Existing virtual dressing applications mainly include virtual dressing websites, virtual dressing mirrors, and mobile virtual dressing systems. Among them, 3D virtual dressing mirrors are the most common-seen ones. Typical examples can be found in real life, such as Magic Dressing Mirror developed by the Russian AR DOOR and the Active Lab invented by the Japanese Digital Fashion, a fully interactive virtual dressing mirror.

In terms of strengths, virtual dressing websites are simple to operate and are not heavily equipment-dependent; however, it is difficult to achieve the identical effect in accordance with the users' figures and through simple parameter adjustment, and it lacks the simulation of the model's facial features and the garment's texture, leading to poor sense of reality and layering. In terms of the working principle of a virtual dressing mirror, the users' image, body dimensions, and motion information are obtained through a depth camera (such as Kinect), and body dimension parameters are utilized to reconstruct 3D human body models consistent with the users' body shapes; meanwhile, the displayed garment models are put onto human body models, and the users can control human body models to move and thus check the effect of virtual dressing. When it comes to the strengths, this method relies on simple movements and gestures to finish dressing, allowing the users to check their own dressing effects and displaying good real-time and interactivity performance Its defects lie in that the model rendering effects differ significantly from actual results, and it is often the case that the garment models cannot fit well with human bodies, raising higher requirements for the deformation of garment mesh. Only in this way can they fit with different human bodies and deform naturally along with human bodies' motions. The garment deformation method proposed in this invention achieves the goal by driving garment mesh deformation through human body deformation.

In the fields like computer graphics, 3D model deformation is a very important topic. The deformation of a 3D model means that local details are maintained as many as possible while changing the global shape of the model. Local details are intrinsic attributes of a 3D model, so such attributes shall be maintained unchanged during the model deformation. The garment deformation methods in the current virtual dressing applications are basically driven by Skinned Mesh animations. In these methods, the animators shall conduct rigging on the garment in advance, which takes huge labor and time costs. Moreover, the skinning effect of the garment is directly achieved through the rigging, but locally overstretched garment mesh deformation will easily occur in real life due to inappropriate skinning weight in the actual virtual dressing, thus affecting the dressing effect. The Laplacian garment deformation method relied on by this invention avoids this problem well.

Differential coordinates in the Laplacian deformation algorithm are local ones that represent intrinsic attributes of local details of 3D models. According to the Laplacian deformation method, some vertices in the 3D models are chosen to form fixed regions, which are called "deformation handles", while other vertices are utilized to generate deformation regions. By moving the deformation handles, other unchosen vertices will change with the Laplacian system, thus achieving the smooth deformation effect.

In this invention, discretized vertices of the human body are utilized as the deformation handles, and the users drive some joints of the human body model to move and produce the human body deformation, thus driving the garment mesh worn by the human body to deform with the help of the Laplacian system.

SUMMARY OF THE INVENTION

The invention aims to provide a garment deformation method based on the human body's Laplacian deformation. The simple, efficient and highly real-time method provided by this invention is a critical technology of real-time virtual dressing interaction, which not only solves the manual preprocessing required by the deformation of garment mesh but also overcomes local overstretching of current deformation algorithms; driven by the human body, the garment deforms smoothly and still maintains local features of the garment after the deformation.

A method of garment deformation based on Laplacian deformation of human body, comprising following steps:

(1) inputting polygonal mesh models of the human body and the garment;

(2) discretizing non-homogeneous mesh models of the human body and the garment inputted in Step (1);

(3) clustering all the discretized mesh vertices, to reduce the number of vertices and to form a set of homogeneous discrete vertices;

(4) constructing Laplacian matrices of the human body and the garment;

(5) preprocessing and solving inverse matrices;

(6) editing by using the human body mesh as a control vertex, to drive a real-time smooth deformation of the garment mesh;

(7) mapping a deformed and simplified mesh back to a mesh space of an original resolution to get deformed human body and garment mesh models.

In the said Step (1), the mesh of 3D human body and garment models inputted are generally non-homogeneously distributed in real life; some parts of the mesh are dense and other parts are sparse. If non-homogeneous mesh is directly applied to the mesh deformation, the deformation effect will be greatly affected. Therefore, the human body and garment models shall be optimized during the preprocessing step to make them homogeneous.

In the said Step (2), the non-homogeneous human body mesh $M_B$ and the garment mesh $M_C$ inputted in Step (1) are discretized to retrieve only vertex information from inputted mesh information, and get the sets of original vertices, namely, $V_B$ and $V_C$. During the discretization, record distances between all vertices and their topological connections among the original mesh data for use in the mapping of Step (7).

In the said Step (3), the set of discretized human body vertices $V_B$ and the set of discretized garment vertices $V_C$ are voxelized, and the space is decomposed into n×n voxels, each with a cubic radius of d. With the set of vertices $V_B$ for the human body mesh as an example, for the ith voxel $V_B^i$ in it, supposing that there are m human body mesh vertices $M_B^i$, $M_B^{i+1}$, ..., $M_B^{m-1}$ in the space covered by it, combine the m mesh vertices in the voxel VA into a single vertex.

Further, handling all human body and garment vertices in the same way to get a simplified, discretized, and homogeneous set of vertices $V_B'$ for the human body mesh and a simplified, discretized, and homogeneous set of vertices $V_C'$ for the garment mesh.

Further, based on original topological connections from Step (2), adding edge connections to all vertices in the simplified set of vertices for new topological connections, which are used for constructing the Laplacian matrix in Step (4).

In the said Step (4), the Laplacian operator matrices L for the human body and garment models are established. Since the human body model and the garment model are two independent models and all vertices in these two models have their own topological connections, these two models are separated from each other in terms of topology. In the meantime, as the deformation of the garment mesh shall be driven by human body mesh, the discretized set of vertices of these two models shall be treated as a whole while constructing the Laplacian matrix. The topological information and geometric information of the 3D model shall be considered simultaneously, so a geometric Laplacian matrix shall be constructed during this step Further, the set of vertices from the discretized and simplified human body and garment models is defined as V, which contains n vertices; among them, the Euclidean coordinates of any vertex i can be expressed as $v_i = [v_{ix}, v_{iy}, v_{iz}]^T \in R^3$. For the set of vertices, $V = [v_1^T, v_2^T, \ldots, v_n^T]^T$.

Further, the positions of all vertices in the set of vertices V can be expressed, with a dimension of n, as the vector F. Correspondingly, the Laplacian matrix is n×n's matrix L. Therefore, multiply the Laplacian matrix and the position vector of the vertexes for the discretized human body and garment models, namely, L×F.

Further, the Laplacian matrix is a sparse matrix, whose way of assigning non-zero element values resembles the adjacency matrix between vertices. Considering the topology information of the set of vertices V, if there is an edge between any two vertices i, j, the weight between these two vertices is not zero, namely, $w_{ij} \neq 0$, corresponding to the element $a_{ij} = w_{ij} (i \neq j)$ in the Laplacian matrix.

Further, for the element $a_{ii}$ in a diagonal line of the Laplacian matrix, its value refers to the number of vertices that connect to vertex i through an edge.

In the said Step (5), the inverse matrix is preprocessed and solved. The core of Laplacian deformation is to convert the coordinates of the vertex from the Euclidean space to the differential coordinates space. To keep local details of the garment model unchanged, the deformed local differential coordinates shall also be maintained unchanged. The entire deformation process is shown below:

First, calculate the differential coordinates of each vertex falling under the set of vertices V:

$$\Delta = L(V).$$

Wherein, $\Delta$ refers to the differential or Laplacian coordinates of the vertex, corresponding to three components of three coordinate axes in the local space of differential coordinates.

Second, move some vertices in the human body model, and see these vertices as the deformation handle to get the new Euclidean coordinates of the vertex on the deformation handle:

$$v_i' = u_i, i \in C$$

Wherein, C refers to the set of all vertices on the handle. $u_i$ refers to the new position of the ith vertex on the handle; $v_i'$ represents the new position of the ith vertex.

Third, based on the differential coordinates and the new position of the vertex on the handle, the least square method is utilized to calculate the positions of other vertices in the set of vertices V:

$$V = \arg\min \left( \|L(V') - \Delta\|^2 + \sum_{i \in C} \|v_i' - u_i\|^2 \right)$$

Wherein, V' refers to the new position vectors of all vertices.

Fourth, simplify the optimal equation in the third step to transform the optimization problem for solution:

$$AV' = b$$

Specifically, $$A = \begin{pmatrix} L \\ F \end{pmatrix}, F_{i,j} = \begin{cases} 1, & j = s_i \in C \\ 0, & \text{Others} \end{cases}$$

$$b_k = \begin{cases} 0, & k \leq n \\ x_{s_{k-n}}, & n < k \leq n+m \end{cases}$$

Further, the above optimization problem can be expressed as:

$$\min \|Ax - b\|$$

Since A are not square matrices, the systems cannot be directly solved, and the above systems can be expressed as:

$$A^T A x = A^T b$$

$$x = (A^T A)^{-1} A^T b$$

Further, $A^T A$ are positive definite systems; the systems can be decomposed into two triangular matrices to multiply each other:

$$A^T A = R^T R$$

Further, the equation systems can be transformed into:

$$R^T R x = A^T b$$

$$R^T \tilde{x} = A^T b$$

$$R x = \tilde{x}$$

$$x = R^{-1} \tilde{x}$$

As a result, the solution to the inverse matrix $R^{-1}$ shall be obtained first, and an intermediate variable is utilized to solve the positions x of all vertices in the final set of vertices.

In the said Step (6), changes are made to the control vertices of human boxy mesh through the Laplacian matrix to drive real-time smooth deformation of garment mesh.

Pursuant to the processes described in Step (5), during the virtual dressing, the motion information inputted by the customers is seen as new positions of the control handle vertices of the human body model; by solving the above least square problem, the new positions of deformed human body and garment models can be obtained.

In the said Step (7), the deformed and simplified human body and garment mesh are mapped back to the mesh space of original resolution based on the recorded distances ad topological connections to get the ultimately deformed human body and garment mesh.

In the said Step (3), the simplified set of vertices $V_B'$ for human body mesh and the simplified set of vertices $V_C'$ for the garment mesh are obtained through voxelization and conglomeration. With the vertices of human body mesh as an example, in the original non-simplified set of vertices $V_B$ for human body mesh, for any vertex i, m simplified vertices of human body mesh can be found within the given distance range: $s_1, s_2, \ldots$, and the distance between Vertex i and m simplified human body mesh vertices can be recorded as $d_s^1, d_s^2, \ldots, d_s^m$.

Further, the Euclidean coordinates of Vertex i can be expressed as:

$$v_i = v_s^1 w(d_s^1) + v_s^2 w(d_s^2) + v_s^3 w(d_s^3) + \ldots + v_s^m w(d_s^m)$$

Wherein, $v_s^j$, j=1, 2, ..., m refers to Euclidean coordinates of m simplified vertices; $w(d_s^j)$ represents the weighting function with the distance $d_s^j$ as an independent variable.

Further, based on the weighting function and relations between adjacent vertices recorded in Step (3), calculate the new positions of human body mesh vertices of the original resolution in accordance with the new positions of the deformed and simplified human body mesh vertices, recover the original topological connections, and add edge connections to the recovered vertices.

Further, the same method is adopted for garment mesh vertices, and the deformed mapped human body and garment mesh of the original solution are finally obtained.

Unlike the current garment mesh deformation method, the invention provides a garment deformation method based on the human body's Laplacian deformation, which can simulate how the garment deforms along with human body movements during the virtual dressing process, as embodied in:

(1) The human body is seen as the control vertex for Laplacian deformation to drive the deformation of garment mesh, as long as the Laplacian matrix and the inverse matrix are solved in advance, thus achieving real-time deformation of garment mesh;

(2) During the deformation process of garment mesh, local features can be preserved well, avoiding overstretching.

(3) The human body deformation can be smoothly transmitted to the garment mesh through the proposed algorithm.

DETAILED DESCRIPTION OF THE INVENTION EMBODIMENTS

Figure 1:
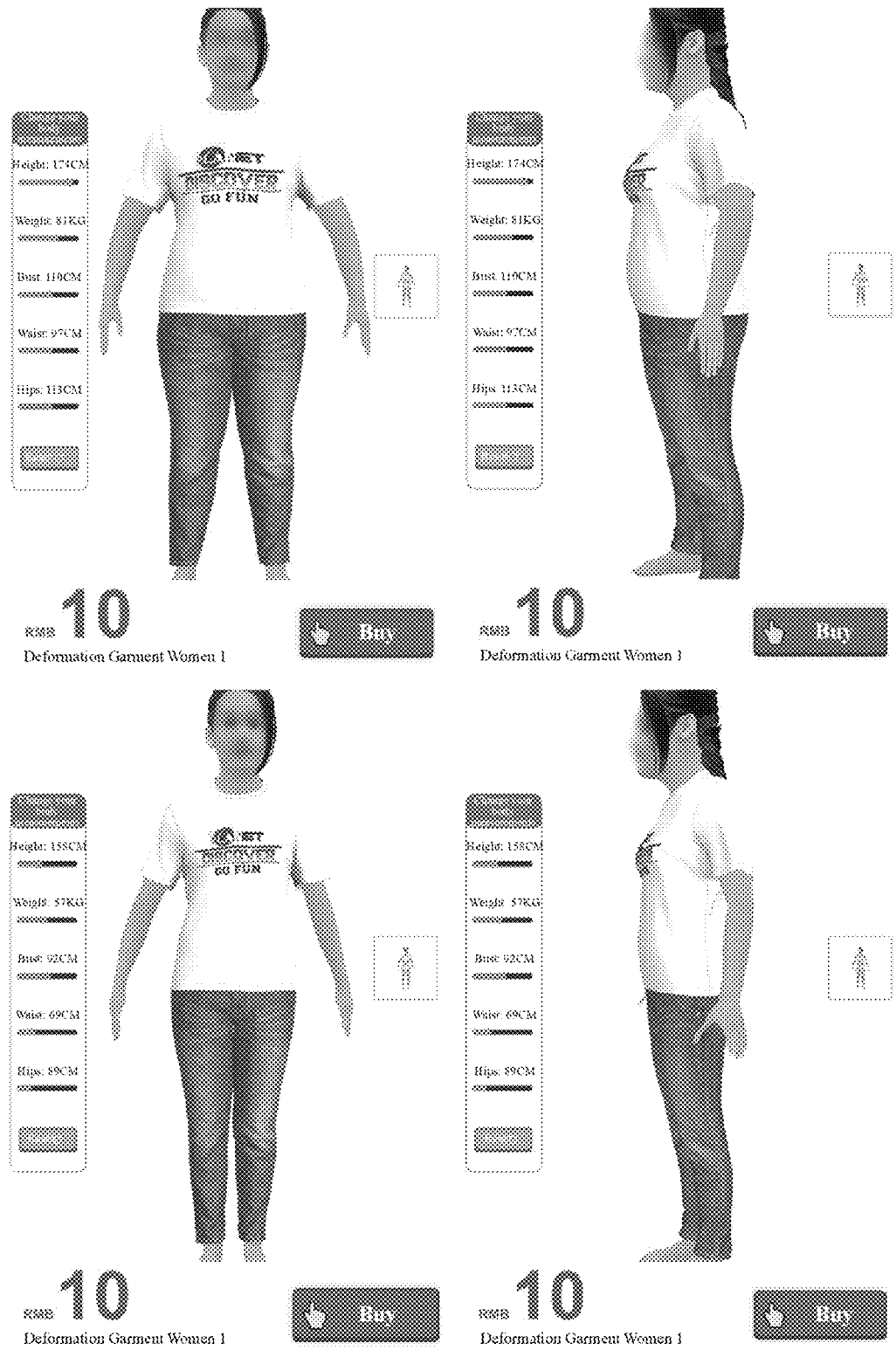
FIG. 1 provides the renderings of two female models with different body shapes who wear T-shirts and trousers for this invention.
Figure 2:
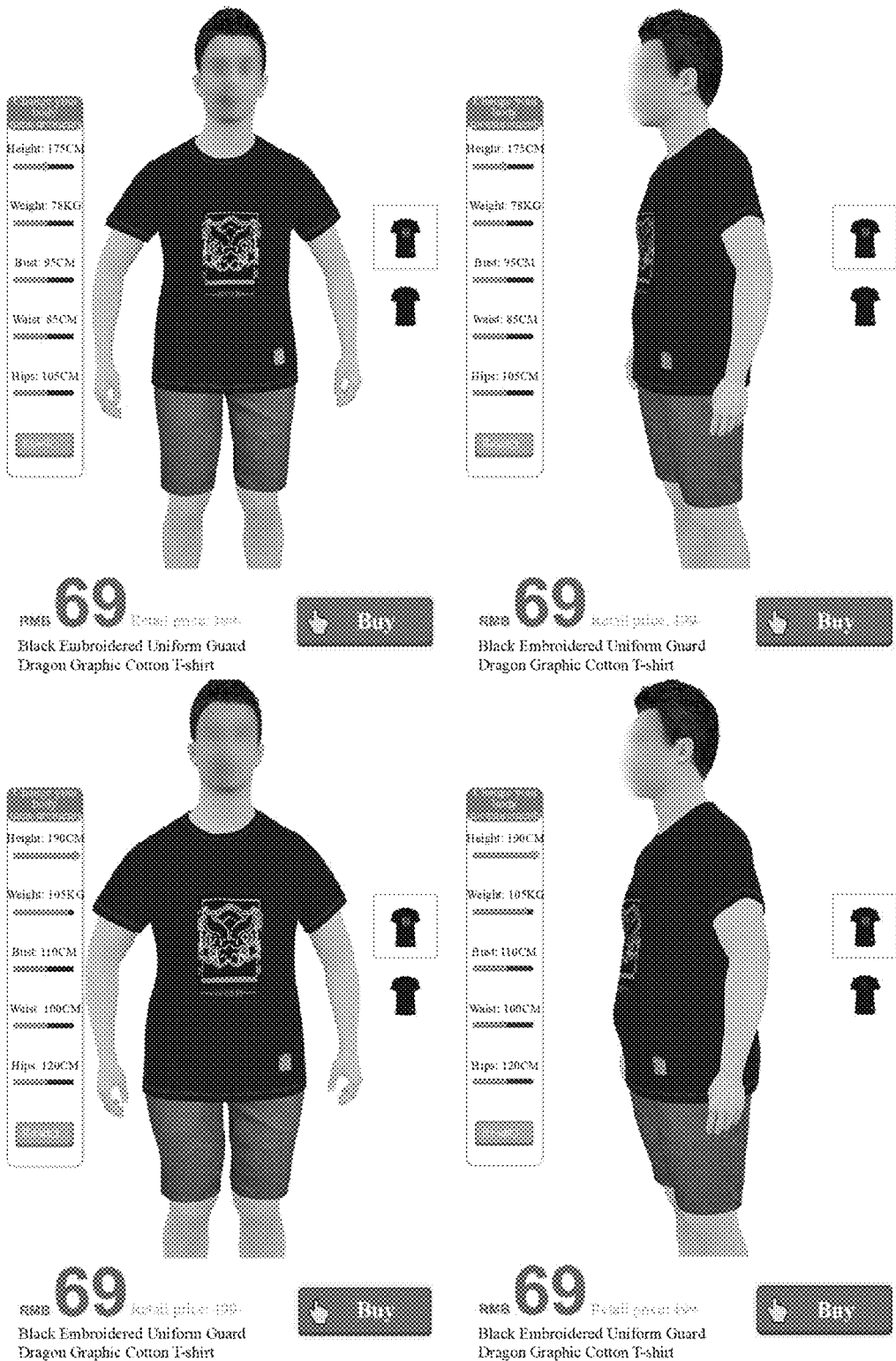
FIG. 2 provides the renderings of two male models with different body shapes who wear T-shirts and shorts for this invention.

Next, the technical solution in this invention will be further detailed in conjunction with figures and embodiments.

(1) inputting polygonal mesh models of the human body and the garment;

(2) discretizing non-homogeneous mesh models of the human body and the garment inputted in Step (1);

(3) clustering all the discretized mesh vertices, to reduce the number of vertices and to form a set of homogeneous discrete vertices;

(4) constructing Laplacian matrices of the human body and the garment;

(5) preprocessing and solving inverse matrices;

(6) editing by using the human body mesh as a control vertex, to drive a real-time smooth deformation of the garment mesh;

(7) mapping a deformed and simplified mesh back to a mesh space of an original resolution to get deformed human body and garment mesh models.

In the said Step (1), the mesh of 3D human body and garment models inputted are generally non-homogeneously distributed in real life; some parts of the mesh are dense and other parts are sparse. If non-homogeneous mesh is directly applied to the mesh deformation, the deformation effect will be greatly affected. Therefore, the human body and garment models shall be optimized during the preprocessing step to make them homogeneous.

In the said Step (2), the non-homogeneous human body mesh $M_B$ and the garment mesh $M_C$ inputted in Step (1) are discretized to retrieve only vertex information from inputted mesh information, and get the sets of original vertices, namely, $V_B$ and $V_C$. During the discretization, record distances between all vertices and their topological connections among the original mesh data for use in the mapping of Step (7).

In the said Step (3), the set of discretized human body vertices $V_B$ and the set of discretized garment vertices $V_C$ are voxelized, and the space is decomposed into n×n voxels, each with a cubic radius of d. With the set of vertices $V_B$ for the human body mesh as an example, for the ith voxel $V_B^i$ in it, supposing that there are m human body mesh vertices $M_B^i, M_B^{i+1}, \ldots, M_B^{m-1}$ in the space covered by it, combine the m mesh vertices in the voxel $V_B^i$ into a single vertex.

(3-3) Handling all human body and garment vertices in the same way to get a simplified, discretized, and homogeneous set of vertices $V_B'$ for the human body mesh and a simplified, discretized, and homogeneous set of vertices $V_C'$ for the garment mesh.

(3-4) Based on original topological connections from Step (2), adding edge connections to all vertices in the simplified set of vertices for new topological connections, which are used for constructing the Laplacian matrix in Step (4).

In the said Step (4), the Laplacian operator matrices L for the human body and garment models are established. Since the human body model and the garment model are two independent models and all vertices in these two models have their own topological connections, these two models are separated from each other in terms of topology. In the meantime, as the deformation of the garment mesh shall be driven by human body mesh, the discretized set of vertices of these two models shall be treated as a whole while constructing the Laplacian matrix. The topological information and geometric information of the 3D model shall be considered simultaneously, so a geometric Laplacian matrix shall be constructed during this step (4-1) The set of vertices from the discretized and simplified human body and garment models is defined as V, which contains n vertices; among them, the Euclidean coordinates of any vertex i can be expressed as $v_i = [v_{ix}, v_{iy}, v_{iz}]^T \in R^3$. For the set of vertices, $V = [v_1^T, v_2^T, \ldots, v_n^T]^T$.

(4-2) Further, the positions of all vertices in the set of vertices V can be expressed, with a dimension of n, as the vector F. Correspondingly, the Laplacian matrix is n×n's matrix L. Therefore, multiply the Laplacian matrix and the position vector of the vertexes for the discretized human body and garment models, namely, L×F.

(4-3) Further, the Laplacian matrix is a sparse matrix, whose way of assigning non-zero element values resembles the adjacency matrix between vertices. Considering the topology information of the set of vertices V, if there is an edge between any two vertices i, j, the weight between these two vertices is not zero, namely, $w_{ij} \neq 0$, corresponding to the element $a_{ij} = w_{ij}$ ($i \neq j$) in the Laplacian matrix.

(4-4) Further, for the element $a_{ii}$ in a diagonal line of the Laplacian matrix, its value refers to the number of vertices that connect to vertex i through an edge.

In the said Step (5), the inverse matrix is preprocessed and solved. The core of Laplacian deformation is to convert the coordinates of the vertex from the Euclidean space to the differential coordinates space. To keep local details of the garment model unchanged, the deformed local differential coordinates shall also be maintained unchanged. The entire deformation process is shown below:

(5-1) First, calculate the differential coordinates of each vertex falling under the set of vertices V:

$$\Delta = L(V).$$

Wherein, $\Delta$ refers to the differential coordinates of the vertex.

(5-2) Second, move some vertices in the human body model, and see these vertices as the deformation handle to get the new Euclidean coordinates of the vertex on the deformation handle:

$$v_i' = u_i, i \in C$$

Wherein, C refers to the set of all vertices on the handle. $u_i$ refers to the new position of the ith vertex on the handle; $v_i'$ represents the new position of the ith vertex.

(5-3) Third, based on the differential coordinates and the new location of the vertex on the handle, the least square method is utilized to calculate the locations of other vertices in the set of vertices V:

$$V = \arg\min \left( \|L(V') - \Delta\|^2 + \sum_{i \in C} \|v_i' - u_i\|^2 \right)$$

Wherein, V' refers to the new position vectors of all vertices.

(5-4) Fourth, simplify the optimal equation in the third step to transform the optimization problem for solving the following linear equations:

$$AV' = b$$

Specifically, $$A = \begin{pmatrix} L \\ F \end{pmatrix}, F_{ij} = \begin{cases} 1, & j = s_i \in C \\ 0, & \text{Others} \end{cases}$$

$$b_k = \begin{cases} 0, & k \leq n \\ x_{s_{k-n}}, & n < k \leq n+m \end{cases}$$

(5-5) The above optimization problem can be expressed as:

$$\min \|Ax - b\|$$

Since A is not a square matrix, the system cannot be directly solved, and the above system can be expressed as:

$$A^T A x = A^T b$$

$$x = (A^T A)^{-1} A^T b$$

(5-6) $A^T A$ are positive definite systems, the systems can be decomposed into two triangular matrices to multiply each other:

$$A^T A = R^T R$$

(5-7) The equation systems can be transformed into:

$$R^T R x = A^T b$$

$$R^T \tilde{x} = A^T b$$

$$R x = \tilde{x}$$

$$x = R^{-1} \tilde{x}$$

As a result, the solution to the inverse matrix $R^{-1}$ shall be obtained first, and an intermediate variable is utilized to solve the positions x of all vertices in the final set of vertices.

In the said Step (6), changes are made to the control vertices of human boxy mesh through the Laplacian matrix to drive real-time smooth deformation of garment mesh. Pursuant to the processes described in Step (5), during the virtual dressing, the motion information inputted by the users is seen as new positions of the control handle vertices of the human body model; by solving the above least square problem, the new positions of deformed human body and garment models can be obtained.

In the said Step (7), the deformed and simplified human body and garment mesh are mapped back to the mesh space of original resolution based on the recorded distances ad topological connections to get the ultimately deformed human body and garment mesh.

(7-1) In the said Step (3), the simplified set of vertices $V_B'$ for human body mesh and the simplified set of vertices $V_C'$ for the garment mesh are obtained through voxelization and conglomeration. With the vertices of human body mesh as an example, in the original non-simplified set of vertices $V_B$ for human body mesh, for any vertex i, m simplified vertices of human body mesh can be found within the given distance range: $s_1, s_2, \ldots, s_m$, and the distance between Vertex i and m simplified human body mesh vertices can be recorded as $d_s^1, d_s^2, \ldots, d_s^m$.

(7-2) Euclidean coordinates of Vertex i can be expressed as:

$$v_i = v_s^1 w(d_s^1) + v_s^2 w(d_s^2) + v_s^3 w(d_s^3) + \ldots + v_s^m w(d_s^m)$$

Wherein, $v_s^j$, $j = 1, 2, \ldots, m$ refers to the Euclidean coordinates of m simplified vertices; $w(d_s^j)$ represents the weighting function with the distance $d_s^j$ as an independent variable.

(7-3) Based on the weighting function and relations between adjacent vertices recorded in Step (3), calculate the new positions of human body mesh vertices of the original resolution in accordance with the new positions of the deformed and simplified human body mesh vertices, recover the original topological connections, and add edge connections to the recovered vertices.

(7-4) The same method is adopted for garment mesh vertices, and the deformed mapped human body and garment mesh of the original solution are finally obtained.

Above are detailed descriptions about this invention, but the embodiments of this invention are not limited to the above ones, and other alterations, replacements, combinations, and simplifications made under the guidance of the core idea of this invention shall also be included in the protection range of this invention.

The invention claimed is:

1. A method of garment deformation based on Laplacian deformation of a human body, comprising the following steps:
   (1) inputting polygonal mesh models of the human body and the garment;
   (2) discretizing non-homogeneous mesh models of the human body and the garment inputted in Step (1);
   (3) clustering all the discretized mesh vertices, to reduce a number of vertices and to form a set of homogeneous discrete vertices;
   (4) constructing Laplacian matrices of the human body and the garment;
   (5) preprocessing and solving inverse matrices;
   (6) editing by using the human body mesh as a control vertex, to drive a real-time smooth deformation of the garment mesh; and
   (7) mapping a deformed and simplified mesh back to a mesh space of an original resolution to obtain deformed human body and garment mesh models.

2. The method of claim 1, wherein in the Step (1), the inputted mesh models of the human body and the garment are non-homogeneously distributed; portions of the mesh are dense and other portions of the mesh are sparse; and in the Step (2), the mesh models of the human body and the garment models are modified during a preprocessing step to make the mesh models of the human body and the garment homogeneous.

3. The method of claim 1, wherein in the Step (2), the non-homogeneous human body mesh $M_B$ and the garment mesh $M_C$ are discretized to retrieve only vertex information from inputted mesh information thus obtaining sets of original vertices $V_B$ and $V_C$; and during the discretization, distances are recorded between all vertices and topological connections of the vertices among original mesh data for use in the mapping of Step (7).

4. The method of claim 3, wherein to reduce the number of vertices and to form the set of homogeneous discretized vertices, in the Step (3), a set of discretized human body vertices $V_B$ and a set of discretized garment vertices $V_C$ are voxelized, and the space is decomposed into n×n voxels, each with a cubic radius of d; with the set of discretized human body vertices $V_B$, for the ith voxel $V_B^i$, there are m human body mesh vertices $M_B^i$, $M_B^{i+1}$, ..., $M_B^{m-1}$ in a space covered by the set of discretized human body vertices $V_B$ and the m human body mesh vertices are combined in the voxel $V_B^i$ into a single vertex;
   the Step (3) further comprises handling all human body and garment vertices in a same way to obtain a simplified, discretized, and homogeneous set of vertices $V_B'$ for the human body mesh and a simplified, discretized, and homogeneous set of vertices $V_C'$ for the garment mesh; and
   based on the topological connections from Step (2), adding edge connections to all vertices in the simplified sets of vertices $V_B'$ and $V_C'$ for new topological connections, which are used for constructing the Laplacian matrix in the Step (4).

5. The method of claim 4, wherein the human body model and the garment model are two independent models and all vertices in the human body model and the garment model have their own topological connections, the human body model and the garment model are separated from each other in terms of topology; as the deformation of the garment mesh is driven by human body mesh, the discretized set of vertices of the human body model and the garment model is treated as a whole while constructing the Laplacian matrix; the topological information and geometric information of the human body model and the garment model is considered simultaneously, and a geometric Laplacian matrix is constructed during the step 4;
   the set of vertices from the discretized and simplified human body and garment models is defined as V and contains n vertices; among the n vertices, Euclidean coordinates of any vertex i is expressed as $v_i = [v_{ix}, v_{iy}, v_{iz}]^T \in R^3$ and the set of vertices is expressed as $V = [v_1^T, v_2^T, \ldots, v_n^T]^T$;
   positions of all vertices in the set of vertices V are expressed, with a dimension of n, as a vector F; the Laplacian matrix is an n×n matrix L and the Laplacian matrix and the position vector of the vertexes for the discretized human body and garment models are multiplied to obtain L×F;
   the Laplacian matrix is a sparse matrix that assigns non-zero element values resembling an adjacency matrix between vertices; in considering the topology information of the set of vertices V, if there is an edge between any two vertices i, j, the weight between the two vertices is not zero, such that $w_{ij} \neq 0$, corresponding to an element $a_{ij} = w_{ij}$ (where $i \neq j$) in the Laplacian matrix;
   for an element $a_{ii}$ in a diagonal line of the Laplacian matrix, a value of the element $a_{ii}$ refers to a number of vertices that connect to vertex i through an edge.

6. The method of claim 5, wherein a deformed simplified mesh is mapped back to the mesh space of original resolution and in the Step (3), the simplified set of vertices $V_B'$ for the human body mesh and the simplified set of vertices $V_C'$ for the garment mesh are obtained through voxelization and combination; for the vertices of the human body mesh, in the original non-simplified set of vertices $V_B$ for human body mesh, for any vertex i, m simplified vertices of the human body mesh are found within a given distance range: $s_1$, $s_2$, ..., $s_m$, and a distance between Vertex i and the m simplified human body mesh vertices is recorded as $d_s^1$, $d_s^2$, ..., $d_s^m$;
   Euclidean coordinates of Vertex i are expressed as:

$$v_i = v_s^1 w(d_s^1) + v_s^2 w(d_s^2) + v_s^3 w(d_s^3) + \ldots + v_s^m w(d_s^m);$$

wherein, $v_s^j$, j=1, 2, ..., m refers to Euclidean coordinates of m simplified vertices; $w(d_s^j)$ represents a weighting function with a distance $d_s^j$ as an independent variable;
   based on the weighting function and relationships between adjacent vertices recorded in Step (3), new positions of human body mesh vertices of the original resolution are calculated in accordance with the new positions of the deformed and simplified human body mesh vertices, the original topological connections are recovered, and edge connections are added to the recovered vertices; and
   a same method is adopted for garment mesh vertices, and the deformed mapped human body and garment mesh of the original resolution are obtained.

7. The method of claim 1, wherein during preprocessing and solving the inverse matrix, Laplacian deformation is used to convert the coordinates of a vertex from a Euclidean space to a differential coordinates space; to keep local details of the garment model unchanged, the deformed local differential coordinates are unchanged; and the Laplacian deformation process comprises:

calculating the differential coordinates of each vertex falling under the set of vertices V:

$\Delta = L(V)$ wherein $\Delta$ refers to the differential or Laplacian coordinates of the vertex, corresponding to three components of three coordinate axes in a local space of differential coordinates;

moving vertices in the human body model, and using the vertices as a deformation handle to obtain the new Euclidean coordinates of the vertex on the deformation handle according to:

$v_i' = u_i, i \in C$ wherein C refers to the set of all vertices on the deformation handle; $u_i$ refers to a new position of the ith vertex on the deformation handle; and $v_i'$ represents the new position of the ith vertex;

based on the differential coordinates and the new position of the vertex on the deformation handle, utilizing a least square method to calculate the positions of other vertices in the set of vertices V according to:

$$V = \operatorname{argmin}\left( \|L(V') - \Delta\|^2 + \sum_{i \in C} \|v_i' - u_i\|^2 \right)$$

wherein, V' refers to the new position vectors of all vertices;

simplifying the optimal equation in the third step to transform the optimization problem according to:

$AV' = b$ specifically, $$A = \begin{pmatrix} L \\ F \end{pmatrix}, F_{ij} = \begin{cases} 1, j = s_i \in C \\ 0, \text{Others} \end{cases}$$

$$b_k = \begin{cases} 0, & k \leq n \\ x_{s_{k-n}}, & n < k \leq n + m \end{cases};$$

the optimization problem is expressed as:

$\min \|Ax - b\|;$ systems are expressed as:

$A^T A x = A^T b$ $x = (A^T A)A)^{-1} A^T b;$ $A^T A$ are positive definite systems; the systems are decomposed into two triangular matrices to multiply each other according to:

$A^T A = R^T R;$ equation systems are transformed into:

$R^T R x = A^T b$ $R^T \tilde{x} = A^T b$ $R x = \tilde{x}$ $x = R^{-1} \tilde{x};$ and a solution to the inverse matrix $R^{-1}$ is obtained, and an intermediate variable is utilized to solve positions x of all vertices in the final set of vertices.

8. The method of claim 7, wherein the human body mesh is deformed as control vertices in accordance with the Laplacian matrix, driving real-time smooth deformation of the garment mesh, wherein pursuant to the processes described in Step (5), during a virtual dressing, motion information inputted by a customer is seen as new positions of control handle vertices of the human body model; by solving the least square problem, new positions of deformed human body and garment models are obtained.

* * * * *